P. W. PALMER.
MOTION PICTURE MACHINE.
APPLICATION FILED AUG. 13, 1918.
1,425,538.
Patented Aug. 15, 1922.
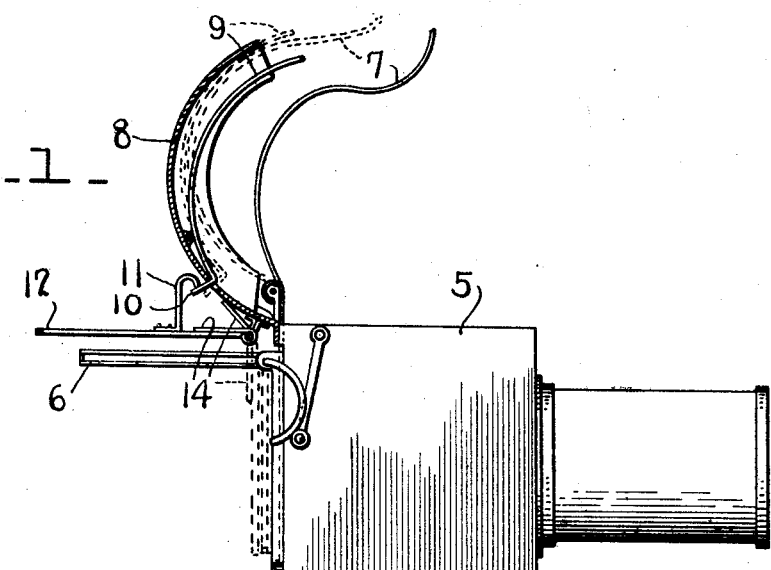
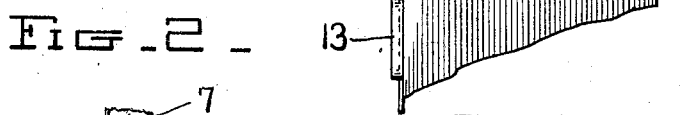
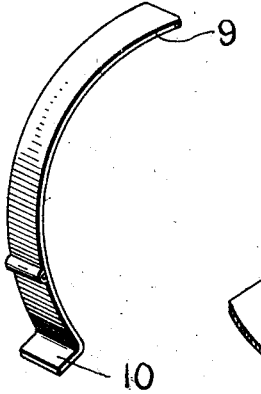
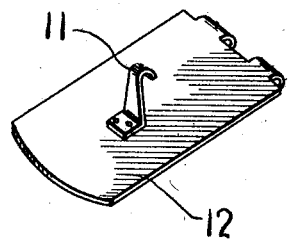
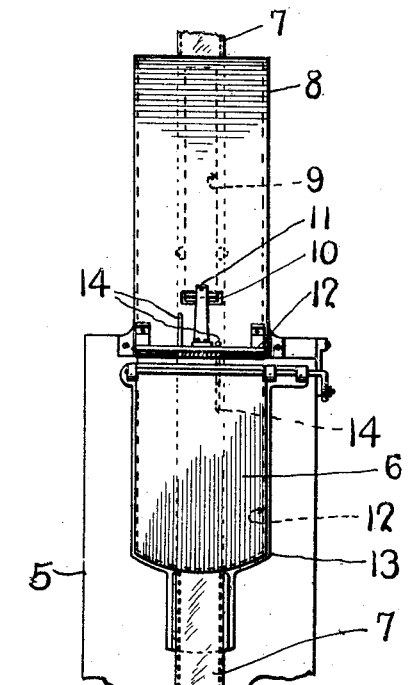
Inventor
P. W. Palmer

UNITED STATES PATENT OFFICE.

PERCY W. PALMER, OF EDGERTON, WISCONSIN.

MOTION-PICTURE MACHINE.

1,425,538.  Specification of Letters Patent.  Patented Aug. 15, 1922.

Application filed August 13, 1918. Serial No. 249,633.

*To all whom it may concern:*

Be it known that PERCY W. PALMER, citizen of the United States, residing at Edgerton, in the county of Rock and State of Wisconsin, has invented certain new and useful Improvements in Motion-Picture Machines, of which the following is a specification.

This invention relates to motion picture machines and more particularly to the fire shutters therefor.

The primary object of this invention resides in the provision of means for automatically closing the fire shutters on motion picture machines immediately upon the stopping of the film while the motor continues to operate.

Another object of this invention resides in the provision of means whereby the projection rays of light in a motion picture machine will be prevented from igniting the film during its failure to move while the motor is in operation.

A still further object of this invention resides in the provision of a fire shutter for motion picture machines which is automatically closed by an irregular looping action of the film due to its stoppage while the motor continues to operate.

With these and other objects in view this invention resides in certain novel features of construction and embodiment of elements to be hereinafter more particularly set forth in the specification herewith and pointed out in the appended claim, it being understood that the right is reserved to resort to such changes in construction as come within the scope of the claim.

In the accompanying drawing:—

Fig. 1 is a side view of a portion of a motion picture machine with the film guard thereof shown in section and the elements embodying this invention secured thereto, the same being illustrated in open position by full lines and in closed position by dotted lines;

Fig. 2 is a rear view of the mechanism shown in Fig. 1 with the fire shutter closed and the elements of this invention illustrated in open position by full lines and in closed position by dotted lines;

Fig. 3 is a detail perspective view of the trigger;

Fig. 4 is a similar view of the fire shutter.

In the present embodiment of this invention, the numeral 5 designates a conventional illustration of a motion picture machine having the usual automatically controlled fire shutter 6 secured for operation between the film 7 and the source of light, not shown.

Carried by the motion picture machine is the usual film guard 8 which heretofore has been used solely to limit the rearward looping of the film during its stoppage while the motor continues to operate, but in its present adoption it is utilized to pivotally support an arcual trigger 9.

This arcual trigger 9 is provided with a finger 10 which projects through an opening in the guard and is adapted to engage a hook 11 that is fastened to an auxiliary fire shutter 12 pivotally supported by the motion picture machine adjacent its usual fire shutter.

The aforesaid auxiliary fire shutter is formed of a piece of non-inflammable material and is normally retained against the film guide 13 by a spring 14 and upon setting this auxiliary fire shutter it is actuated against the tension of the spring 14 and held under the tension thereof by the engagement of the hook 11 with the finger 10 of the arcual trigger 9.

With the auxiliary fire shutter set as hereinbefore stated, the free end of the arcual trigger 9 will project a sufficient distance from the inner periphery of the film guard to permit its finger 10 to pass from beneath the hook 11 of the auxiliary fire shutter upon being rocked by the enlargement of the upper loop of the film whereupon the spring 14 will immediately actuate the auxiliary fire shutter to close the light passage of the motion picture machine.

The above mentioned auxiliary fire shutter while herein so employed to operate in conjunction with the usual fire shutter is readily applicable to machines heretofore being without fire shutters and also to machines which are constructed so that the fire shutter must be hinged to one side of the film guide. In this connection particular attention is directed to the paramount feature of actuating the fire shutter by the enlargement of the upper loop during the continuation of the motor to operate after the film has ceased to move.

The applicant wishes to state that his invention has been designed to primarily be applied to a machine that is not equipped with the fire shutter 6, however, in case this invention is applied to a machine as shown in the drawings, the shutter 12 is supposed to be of sufficient weight to cause the closure of the shutter 6 when 12 strikes against same.

With this invention as above described it is manifest that means are provided for automatically preventing the projection of the rays of light against the film upon its stoppage during the continuation of the motor to operate and in view of the accuracy in operation of the mechanism involved together with the minimum expense necessary in its production, it is apparent that the functions attained are of utmost importance.

Having thus described this invention what I claim is:—

The combination with a motion picture machine; of a film guard thereon, provided with an opening adjacent its inner end, a fire shutter pivoted to said guard at its inner end, resilient means for normally retaining said shutter in its closed position, a trigger fulcrumed within said guard and having its inner end bent at right angles to form a finger, said finger projecting through the opening in said guard, and a hook secured to the inner end of the fire shutter and engaging the finger on said trigger, as and for the purpose described.

In testimony whereof I affix my signature.

PERCY W. PALMER.